(12) United States Patent
Gebhart

(10) Patent No.: US 8,852,040 B2
(45) Date of Patent: Oct. 7, 2014

(54) SWITCHABLE FRICTION CLUTCH HAVING A DRIVE WHEEL DRIVEN BY A DRIVE MOTOR VIA A DRIVE BELT, AND DRIVE UNIT

(75) Inventor: Manfred Gebhart, Constance (DE)

(73) Assignee: Kendrion Linnig GmbH, Markdorf (DE)

( * ) Notice: Subject to any disclaimer, the term of this patent is extended or adjusted under 35 U.S.C. 154(b) by 269 days.

(21) Appl. No.: 13/060,106

(22) PCT Filed: Aug. 6, 2009

(86) PCT No.: PCT/EP2009/005697
§ 371 (c)(1),
(2), (4) Date: Apr. 13, 2011

(87) PCT Pub. No.: WO2010/020349
PCT Pub. Date: Feb. 25, 2010

(65) Prior Publication Data
US 2011/0183798 A1    Jul. 28, 2011

(30) Foreign Application Priority Data
Aug. 22, 2008   (DE) .................... 20 2008 011 202 U

(51) Int. Cl.
*F16H 61/00*   (2006.01)
*F16H 63/00*   (2006.01)
*F16H 9/04*    (2006.01)
*F16D 27/112*  (2006.01)
*F16D 27/12*   (2006.01)

(52) U.S. Cl.
CPC *F16D 27/12* (2013.01); *F16H 9/04* (2013.01); *F16D 27/112* (2013.01)
USPC ............................... 474/73; 474/84; 192/48.2

(58) Field of Classification Search
USPC .................. 474/73, 74, 84, 86, 88, 158, 171; 192/48.2
See application file for complete search history.

(56) References Cited

U.S. PATENT DOCUMENTS 3,203,279 A * 8/1965 Rahrig et al. ............... 474/73
3,675,747 A   7/1972 Obermark
(Continued)

FOREIGN PATENT DOCUMENTS

DE   2325960   12/1974
DE   2341208   2/1975
(Continued)

OTHER PUBLICATIONS

International Search Report for Application No. PCT/EP2009/005697 dated Nov. 12, 2009.

*Primary Examiner* — Sang Kim
*Assistant Examiner* — Juan Campos, Jr.
(74) *Attorney, Agent, or Firm* — Bachman & LaPointe, P.C.

(57) ABSTRACT

The proposal is for a switchable friction clutch having a drive wheel (5) driven by a drive motor via a drive belt, wherein a first electromagnet arrangement (19) is provided for actuating a first friction clutch (21), and a second electromagnet arrangement (24) is provided for actuating a second friction clutch (23) in order to be able to drive a drive shaft (13) of an auxiliary unit (3) at different rotational speeds via the drive wheel (5) at one rotational speed of the drive wheel. According to the invention, a belt drive arrangement is provided between the drive wheel (5) and the drive shaft (13) of the auxiliary unit (3) to drive the drive shaft (13) at the different speed.

12 Claims, 1 Drawing Sheet

(56) References Cited

U.S. PATENT DOCUMENTS

| | | |
|---|---|---|
| 4,488,627 A | 12/1984 | Streich et al. |
| 4,564,092 A | 1/1986 | Pierce |
| 4,758,208 A * | 7/1988 | Bartos et al. ................ 474/135 |
| 4,981,116 A * | 1/1991 | Trinquard ................ 123/90.31 |
| 5,871,412 A | 2/1999 | Moser |
| 5,909,075 A | 6/1999 | Heimark |
| 6,146,296 A | 11/2000 | Apostolo |
| 6,830,524 B2 * | 12/2004 | Tamai ......................... 474/134 |
| 7,472,778 B2 * | 1/2009 | Boffelli et al. ............. 192/48.2 |
| 2006/0137956 A1 | 6/2006 | Boffeli et al. |

FOREIGN PATENT DOCUMENTS

| | | |
|---|---|---|
| DE | 3033140 | 1/1982 |
| DE | 10161700 | 6/2003 |
| GB | 1419941 | 12/1975 |
| GB | 1477212 | 6/1977 |
| WO | 8806233 | 8/1988 |
| WO | 0131218 | 5/2001 |

* cited by examiner

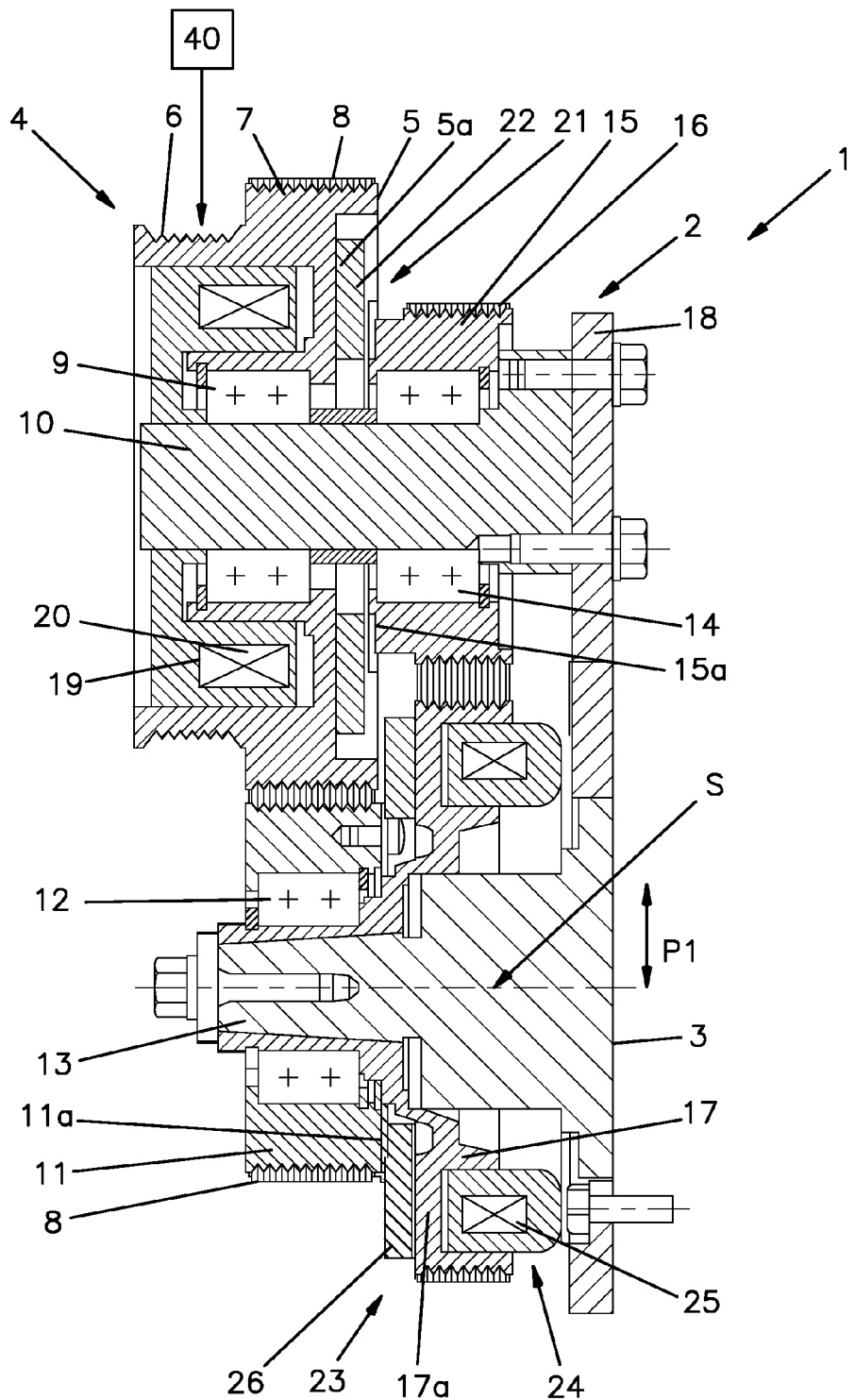

SWITCHABLE FRICTION CLUTCH HAVING A DRIVE WHEEL DRIVEN BY A DRIVE MOTOR VIA A DRIVE BELT, AND DRIVE UNIT

BACKGROUND OF THE INVENTION

The invention relates to a switchable friction clutch and to a drive unit as disclosed herein.

Drive units with a switchable friction clutch for driving an auxiliary unit, in particular for driving the latter in two stages, are known. The drive can be supplied by a drive motor, which imparts rotation to a drive wheel of the drive unit. In the case of drive units for a compressor, for example, the drive wheel, which is designed as a belt pulley for example, can be driven via a drive belt. Respectively associated friction clutches can be actuated by means of two electromagnet arrangements in order to achieve two different rotational speeds of the auxiliary unit shaft, e.g. compressor shaft, to be driven. The shaft of the auxiliary unit can be driven at a rotational speed lower or higher than the rotational speed of the drive wheel, for example.

SUMMARY OF THE INVENTION

It is the object of the present invention to improve a switchable friction clutch and a corresponding drive unit having a drive motor for driving an auxiliary unit at different rotational speeds, particularly as regards more compact construction and easier installation.

This object is achieved by the clutch and drive unit disclosed herein. Advantageous developments of the invention are indicated as well.

The invention starts from a switchable friction clutch having a drive wheel driven by a drive motor via a drive belt, wherein a first electromagnet arrangement is provided for actuating a first friction clutch, and a second electromagnet arrangement is provided for actuating a second friction clutch in order to be able to drive a drive shaft of an auxiliary unit at different rotational speeds via the drive wheel at one rotational speed of the drive wheel. For a particular operational state under consideration, the rotational speed of the drive wheel can be a substantially constant rotational speed, and it is possible to drive the drive shaft of the auxiliary unit in rotation at a speed different from the rotational speed of the drive wheel for virtually any achievable rotational speed of the drive wheel or any particular rotational speed of the drive wheel under consideration.

At the heart of the invention is the fact that a belt drive arrangement is provided between the drive wheel and the drive shaft of the auxiliary unit to drive the drive shaft at the different rotational speeds. With a belt drive arrangement, it is possible to achieve power transmission between the drive wheel and the drive shaft in a robust and space-saving manner. Moreover, it is also possible with a belt drive arrangement to achieve reliable power and torque transmission, even where the distances to be spanned between interacting elements differ greatly and the spatial conditions are difficult. It is advantageous, in particular, in this context that the drive wheel itself can be driven by just one drive belt. Here, the drive wheel rotates at the rotational speed determined by the variable rotational speed of the drive motor and there is advantageously no need for a step up or reduction in the rotational speed. This makes it possible to achieve a rapid response to a demand for full power at the drive wheel and to operate with maximum step-up ratios by means of the belt drive arrangement or, alternatively, with low step-up ratios.

In practice, it is possible in principle that slight or brief fluctuations in the rotational speed of the drive wheel may occur, but this is no problem for the arrangement according to the invention owing to the mechanical behavior of the belt drive arrangement.

Moreover, it is possible, depending on the application, for different step-up or reduction ratios to be set in accordance with the fundamental mechanical laws governing the effective diameters of the rotating elements connected by the belts. In particular, the auxiliary unit can be an air conditioning or cooling compressor in a vehicle with an internal combustion engine.

In the case of such auxiliary units, there may also be a desire to switch off or render passive the auxiliary unit while the driven drive wheel is rotating and to operate said unit in an operational state appropriate to the situation, e.g. to operate it at least two different power levels. In the case of an air conditioning compressor, a lower power level can be chosen if there is only a comparatively small amount of heat to be dissipated, and a higher level can be chosen when the desired heat dissipation is correspondingly greater. In a warm-up or starting phase of vehicle operation, when there may not be any excess heat to be dissipated and there may be no need to compress a refrigerant, the driving action exerted on the compressor shaft can be deactivated. Thus, three-stage operation of the auxiliary unit can be provided.

In particular, the switchable friction clutch and belt drive arrangement according to the invention can readily be mounted as an additional unit on existing sections, and, if required, can be retrofitted without major effort.

Rapid and reliable switching can be achieved, especially by means of an electromagnetically actuable friction disk clutch.

According to another proposal, the axis of rotation of the drive shaft of the auxiliary unit is offset parallel to the axis of rotation of the drive wheel. This makes it possible to achieve not only a switchable friction clutch of compact construction but also a large number of different construction options and arrangements of the components relative to one another.

In particular, optimum use can be made of the available installation space.

In particular, it is possible to reduce the axial installation space which may be required by arranging the drive wheel in a manner offset in a radial direction relative to the axis of rotation of the drive shaft of the auxiliary unit, for example.

The belt drive arrangement preferably comprises a first belt drive having a first driving belt, which rests on a rotatably mounted first intermediate wheel and a flange ring connected in a rotationally fixed manner to the drive shaft of the auxiliary unit. It is thus possible in a simple manner to choose a step-up or reduction ratio between the drive wheel and the drive shaft of the auxiliary unit by way of the size of the diameters of the first intermediate wheel and of the flange ring or the respective belt support for the first driving belt on the first intermediate wheel and that on the flange ring. If desired, it is also possible to set a one-to-one ratio or rotational speed parity. In particular, the first intermediate wheel is switchable or capable of being firmly connected to and decoupled again from a mating section which takes the first intermediate wheel along when they are firmly connected. The mating section is situated on the drive wheel, in particular. Coupling to the drive shaft of the auxiliary unit is set up permanently by way of the flange ring.

It is furthermore advantageous if the belt drive arrangement comprises a second belt drive having a second driving belt, which rests on the drive wheel and a rotatably mounted second intermediate wheel. In this arrangement too, a wide range of different step-up and reduction ratios between the drive wheel and the second intermediate wheel can be chosen, it being possible for the second intermediate wheel to be coupled to a mating section, in particular a section connected to the drive shaft of the auxiliary unit, e.g. the flange ring.

For advantageous provision of a step-up and a reduction ratio between the drive wheel and the drive shaft of the auxiliary unit, a diameter of a belt support for the second driving belt on the drive wheel can differ, in particular, from the diameter of the belt support for the first driving belt on the first intermediate wheel and, in particular, can exceed the last-mentioned diameter. In particular, the diameter of the belt support on the drive wheel for the drive belt is between the abovementioned diameters of the respective belt supports. In particular, the belt supports are formed by V-shaped grooves which are aligned in parallel, which run around in a circle and in which matching V-belt sections of the driving belts, which are designed as V-belts, rest in a power-transmitting manner.

It is particularly advantageous if the first friction clutch is designed to connect the first intermediate wheel and the drive wheel frictionally when the first friction clutch is selected. In this selection state, it is thus possible to activate specifically that driving belt on the drive wheel which rests on the first intermediate wheel. When the first friction clutch is not selected, the frictional connection and power transmission between the drive wheel and the first intermediate wheel is automatically canceled.

It is furthermore advantageous if the second friction clutch is designed to connect the second intermediate wheel and the flange ring frictionally when the second friction clutch is selected. This makes it possible to connect the second intermediate wheel and the flange ring independently to the second friction clutch, thereby making possible a selection state which differs from the selection state when the first friction clutch is selected. Here too, decoupling of the second intermediate wheel from the flange ring takes place, e.g. by way of spring means, when the second friction clutch is not selected.

In an advantageous modification of the subject matter of the invention, the belt drive arrangement is designed in such a way that, when the first friction clutch is selected, the drive shaft of the auxiliary unit rotates at a first rotational speed. In this way it is possible, by means of a selecting operation, to specify a first desired rotational speed for the drive shaft of the auxiliary unit. The first rotational speed of the drive shaft of the auxiliary unit is, in particular, a rotational speed different from the rotational speed of the drive wheel, e.g. a lower rotational speed.

The belt drive arrangement is advantageously designed in such a way that, when the second friction clutch is selected, the drive shaft of the auxiliary unit rotates at a second rotational speed, which differs from the first rotational speed with the first friction clutch selected. In an appropriate selecting operation, a further desired rotational speed of the drive shaft of the auxiliary unit, which is, in particular, higher than the first rotational speed of the drive shaft of the auxiliary unit when the first friction clutch is selected, can be achieved by means of the second friction clutch. With the first friction clutch selected or the second friction clutch selected, the other friction clutch in each case is generally not selected.

In an advantageous embodiment of the subject matter of the invention, the belt drive arrangement is designed in such a way that, when the second friction clutch is selected, the rotational speed of the drive shaft of the auxiliary unit is higher than the rotational speed of the drive wheel. In this way, it is possible to choose a rotational-speed step-up, this being advantageous especially for air conditioning compressors in the case of high cooling capacity, for example.

It is also advantageous if the belt drive arrangement is designed in such a way that, when the first friction clutch is selected, the rotational speed of the drive shaft of the auxiliary unit is lower than the rotational speed of the drive wheel. In this way, it is possible to set a comparatively low rotational speed of the drive shaft of the auxiliary unit, even if the rotational speed of the drive wheel is correspondingly higher in comparison. This can be advantageous, for example, when a relatively low capacity of the auxiliary unit, e.g. a low cooling capacity of an air conditioning compressor in a motor vehicle, is necessary, when the drive wheel is rotating at a comparatively high speed.

According to another proposal, a belt tensioning device is provided for tensioning the driving belts, by means of which it is possible to change the distance between the elements, around which respective driving belts are wrapped. In particular, tensioning is possible by increasing the distance between the first intermediate wheel and the drive wheel, on the one hand, and the second intermediate wheel and the flange ring, on the other hand. In this way, the driving belts can be tensioned at any time and in a finely graduated manner.

The belt tensioning device preferably comprises a shaft section, on which the first intermediate wheel and the drive wheel are rotatably mounted. This is advantageous particularly with regard to compact construction of the switchable friction clutch according to the invention. By way of example, the shaft section can be designed as a rotationally fixed cylindrical profile, the longitudinal axis of which is parallel to the axis of rotation of the drive shaft of the auxiliary unit. The shaft section can be mounted movably on a fixed housing section of the auxiliary unit, for example. It is advantageously possible for an intermediate wheel and a drive unit to be supported rotatably on the shaft section by means of rolling contact bearings and to be installed and removed together with this component.

The invention furthermore relates to a drive unit having a drive motor for driving an auxiliary unit, in particular for a compressor in a vehicle. The drive unit comprises a switchable friction clutch in accordance with one of the embodiments mentioned above. This makes it possible to provide a drive unit which has the advantages and features already explained in connection with the switchable friction clutch.

BRIEF DESCRIPTION OF THE DRAWING

Further advantages and features of the invention are explained with reference to the single FIGURE shown in the drawing.

DETAILED DESCRIPTION

In a highly schematized form, FIG. 1 shows a drive arrangement having a compressor unit and a switchable friction clutch according to the invention in section.

In this arrangement, a drive unit 1 comprises a switchable friction clutch 2 according to the invention for a compressor 3, e.g. an air conditioning compressor in a motor vehicle. By way of a primary drive 4, illustrated only in part, a belt pulley 5 is driven in rotation by means of an engine belt pulley together with a drive belt (schematically illustrated at 40). For this purpose, the drive belt is in power-transmitting contact with the belt pulley 5 in the region of a belt support 6 provided with V-shaped circumferential grooves. Offset radially somewhat outward in the manner of a shoulder there is a further circumferential belt support 7, on which a driving belt 8 of a secondary belt drive rests.

The belt pulley 5 is supported on a rotationally fixed intermediate shaft 10 by way of a rolling contact bearing 9.

Moreover, the driving belt 8 is passed around a first intermediate wheel 11, which extends in a manner offset radially relative to an axis of rotation S of a drive shaft 13 of the compressor 3, in the same axial section as the belt support 7. The intermediate wheel 11 is seated rotatably on the drive shaft 13 by way of a further rolling contact bearing 12.

A further intermediate wheel 15 is rotatably mounted on the intermediate shaft 10 by way of a further rolling contact bearing 14 in a location at an axial distance from or axially offset with respect to the belt pulley 5, and a further driving belt 16 of a further secondary belt drive rests on the intermediate wheel 15. The driving belt 16 is furthermore passed around a belt support of a flange ring 17, which is firmly connected to the drive shaft 13.

The intermediate shaft 10 is mounted by way of a carrier plate 18, which is firmly connected to a housing section of the compressor 3. To tension the driving belts 8 and 16, the carrier plate 18 with the intermediate shaft 10 bolted thereto can be fixed in such a way that it can be moved slightly in accordance with the double arrow P1, e.g. by means of a bolt-slot arrangement.

In the illustrative embodiment shown in FIG. 1, the two driving belts 8 and 16 are of equal length and are of the same belt width, something that can be advantageous in terms of ease of installation and the provision of spare parts.

The switchable friction clutch 2 shown furthermore comprises a first electromagnet arrangement 19 having an electromagnet 20 which, when energized, pulls a first armature disk 22 of a first friction clutch 21 electromagnetically into frictional engagement with a friction section 5a of the belt pulley 5. For this purpose, the armature disk 22 is mounted in an axially movable manner on the intermediate wheel 15 by way of spring means 15a. When the electromagnet 20 is not energized, the restoring force of the spring means 15a pulls the armature disk axially away from the friction section 5a, thus enabling the belt pulley 5 and the intermediate wheel 15 to rotate freely relative to one another with a gap between them.

A second friction clutch 23 having a second electromagnet arrangement 24 and a second electromagnet 25 is provided in the region of the flange ring 17. When the electromagnet 25 is energized, the second electromagnet arrangement 24 can pull an armature disk 26, which is mounted in an axially movable manner on the intermediate wheel 11 by way of spring means 11a, against a friction section 17a of the flange ring 17. When the electromagnet 25 is not energized, the armature disk 26 is moved out of contact with the friction section 17a by the restoring spring means 11a, thus enabling the flange ring 17 and the intermediate wheel 11 to rotate freely relative to one another with a gap between them.

The multi-stage principle of operation of the drive unit 1 is as follows:

When both electromagnet arrangements 19 and 24 are not energized or are switched off, there is no driving action from the belt pulley 5 to the drive shaft 13 of the compressor 3. In this first stage, the compressor 3 does not operate but the belt pulley is driven and rotates.

In a second stage, with electromagnet 20 energized, the intermediate wheel 15 is connected frictionally to the belt pulley 5, with the result that the flange ring 17 and hence the drive shaft 13 are activated, being belt-driven by way of the driving belt 16. The compressor 3 is driven with a rotational speed that is reduced relative to or lower than the rotational speed of the belt pulley 5.

In a further stage 3, in which electromagnet 20 is not energized but the second belt drive is activated through energization of electromagnet 25, and the intermediate wheel 11 is connected to the flange ring 17. The drive shaft 13 and the compressor 3 are driven with a rotational speed that is stepped up relative to or higher than the rotational speed of the belt pulley 5.

The two stages, involving a reduction and a step-up in the rotational speed of the belt pulley 5 with respect to the drive shaft 13, is made possible by the fact that, for step-up, the diameter in the region of the belt support 7 of the belt pulley 5 is larger than the diameter of the belt support for the driving belt 8 on the intermediate wheel 11. For reduction, the intermediate wheel 15 has a smaller diameter in the region of the belt support for the driving belt 16 than the flange ring 17 in the region of the belt support for the driving belt 16.

Thus, in particular, it is possible to achieve a step-up i, formed by the quotient of the diameter of the belt support 7 and the associated diameter of the belt support on the intermediate wheel 11 for the driving belt 8, and a reduction with the reciprocal value 1/i, formed by the quotient of the diameter for the belt support of the intermediate wheel 15 and the diameter for the belt support of the flange ring 17, if the relevant belt support diameters of the two intermediate wheels 15 and 11 are the same and the diameters of the belt support 7 and the belt support on the flange ring 17 are also the same.

It is thereby advantageously possible to achieve a particularly advantageous spread between the step-up and the reduction 1/i in combination with very compact construction.

In principle, however, it is also possible to use other step-up and reduction ratios with advantage.

LIST OF REFERENCE SIGNS

1 drive unit
2 switchable friction clutch
3 compressor
4 primary drive
5 belt pulley
5a friction section
6 belt support
7 belt support
8 driving belt
9 rolling contact bearing
10 intermediate shaft
11 intermediate wheel
11a spring means
12 rolling contact bearing
13 drive shaft
14 rolling contact bearing
15 intermediate wheel
15a spring means
16 driving belt
17 flange ring
17a friction section
18 carrier plate
19 electromagnet arrangement
20 electromagnet
21 friction clutch
22 armature disk
23 friction clutch
24 electromagnet arrangement
25 electromagnet
26 armature disk

The invention claimed is:

1. A switchable friction clutch having a drive wheel driven by a drive motor via a drive belt, wherein a first electromagnet arrangement is provided for actuating a first friction clutch, and a second electromagnet arrangement is provided for actuating a second friction clutch in order to be able to drive a drive shaft of an auxiliary unit at different rotational speeds via the drive wheel at one rotational speed of the drive wheel, wherein a belt drive arrangement is provided between the drive wheel and the drive shaft of the auxiliary unit to drive the drive shaft at the different speeds, wherein the belt drive arrangement comprises a first belt drive having a first driving belt which rests on a rotatably mounted first intermediate wheel and a flange ring connected in a rotationally fixed manner to the drive shaft of the auxiliary unit, wherein the belt drive arrangement comprises a second belt drive having a second driving belt, which rests on the drive wheel and a rotatably mounted second intermediate wheel, wherein the first intermediate wheel can be connected switchably to a mating section (5a) on the drive wheel, and the second intermediate wheel can be coupled switchably to a mating section (17a) on a section which is connected in a rotationally fixed manner to the drive shaft of the auxiliary unit.

2. The switchable friction clutch as claimed in claim 1, wherein the axis of rotation of the drive shaft of the auxiliary unit is offset parallel to the axis of rotation of the drive wheel.

3. The switchable friction clutch as claimed in claim 1, wherein the first friction clutch is designed to connect the first intermediate wheel and the drive wheel frictionally when the first friction clutch is selected.

4. The switchable friction clutch as claimed in claim 1, wherein the second friction clutch is designed to connect the second intermediate wheel and the flange ring frictionally when the second friction clutch is selected.

5. The switchable friction clutch as claimed in claim 1, wherein the belt drive arrangement is designed in such a way that, when the first friction clutch is selected, the drive shaft of the auxiliary unit rotates at a first rotational speed.

6. The switchable friction clutch as claimed in claim 5, wherein the belt drive arrangement is designed in such a way that, when the second friction clutch is selected, the drive shaft of the auxiliary unit rotates at a second rotational speed, which differs from the first rotational speed with the first friction clutch selected.

7. The switchable friction clutch as claimed in claim 1, wherein the belt drive arrangement is designed in such a way that, when the second friction clutch is selected, the rotational speed of the drive shaft of the auxiliary unit is higher than the rotational speed of the drive wheel.

8. The switchable friction clutch as claimed in claim 1, wherein the belt drive arrangement is designed in such a way that, when the first friction clutch is selected, the rotational speed of the drive shaft of the auxiliary unit is lower than the rotational speed of the drive wheel.

9. The switchable friction clutch as claimed in claim 1, wherein a belt tensioning device is provided for tensioning the first and second driving belts, by means of which it is possible to change the distance between the drive wheel, the first intermediate wheel, the second intermediate wheel, and the flange ring, around which respective driving belts (8; 16) are wrapped.

10. The switchable friction clutch as claimed in claim 9, wherein the belt tensioning device comprises a shaft section, on which the first intermediate wheel and the drive wheel are rotatably mounted.

11. A drive unit for driving an auxiliary unit, having a switchable friction clutch as claimed in claim 1.

12. The drive unit of claim 11, wherein the auxiliary unit is a compressor in a vehicle.

* * * * *